United States Patent [19]

Levy

[11] Patent Number: 4,805,955
[45] Date of Patent: Feb. 21, 1989

[54] MOTOR VEHICLE SUNSHIELDS AND SUNSHIELD MAKING METHODS

[76] Inventor: Abraham Levy, P.O. Box 17212, Tel Aviv, Israel, 61171

[21] Appl. No.: 172,627

[22] Filed: Mar. 24, 1988

[51] Int. Cl.$^4$ .............................................. B60J 1/20
[52] U.S. Cl. .................................... 160/84.1; 283/56; 283/105; 493/320; 493/355; 296/97.1
[58] Field of Search ................. 296/97 R, 95 C, 97 E; 283/56, 105; 160/84 R, DIG. 2, DIG. 3, 229 R; 493/320, 355

[56] References Cited

U.S. PATENT DOCUMENTS

| | | | |
|---|---|---|---|
| 2,616,612 | 11/1952 | Guttman | 283/56 |
| 4,005,899 | 2/1977 | Rigney | 296/97 R |
| 4,202,396 | 5/1980 | Levy | 296/97 R |
| 4,636,179 | 1/1987 | Gentile et al. | 283/56 |
| 4,647,102 | 3/1987 | Ebrahimzadeh | 296/97 D |
| 4,652,039 | 3/1987 | Richards | 296/97 R |
| 4,671,334 | 6/1987 | Yadegar et al. | 160/84 R |
| 4,671,558 | 6/1987 | Cline | 296/97 R |
| 4,727,920 | 3/1988 | Siegler | 296/97 R |
| 4,751,115 | 6/1988 | Smith et al. | 296/95 C |

OTHER PUBLICATIONS

"Folding Car Shades Are a Red-Hot Item in Sun Belt," *Los Angeles Times* Business Section, Monday, Sep. 8, 1986.

*Primary Examiner*—Robert R. Song
*Attorney, Agent, or Firm*—Benoit Law Corporation

[57] ABSTRACT

A sunshield is made of a shading material having a predetermined value per unit area. The sunshield is divided into a sunshield proper or main body and a predetermined portion adjacent that main body corresponding in location to a certain component of the motor vehicle inside and in the vicinity of the window, in terms of a positioning of the sunshield in that window. The sunshield is scored between the main body and that predetermined portion, and a redeemable value being greater in terms of unit area than the value per unit area first mentioned herein is imparted to that predetermined portion. A combination of printed matter and structure may be employed for that purpose. The ultimate user of the sunshield is prompted by the greater value of the mentioned predetermined portion to complete the making of the sunshield by removing that predetermined portion as a redeemable coupon from the main body at the scoring, thereby making way for the rearview mirror or other component of the motor vehicle when the sunshield main body is positioned inside the window.

21 Claims, 2 Drawing Sheets

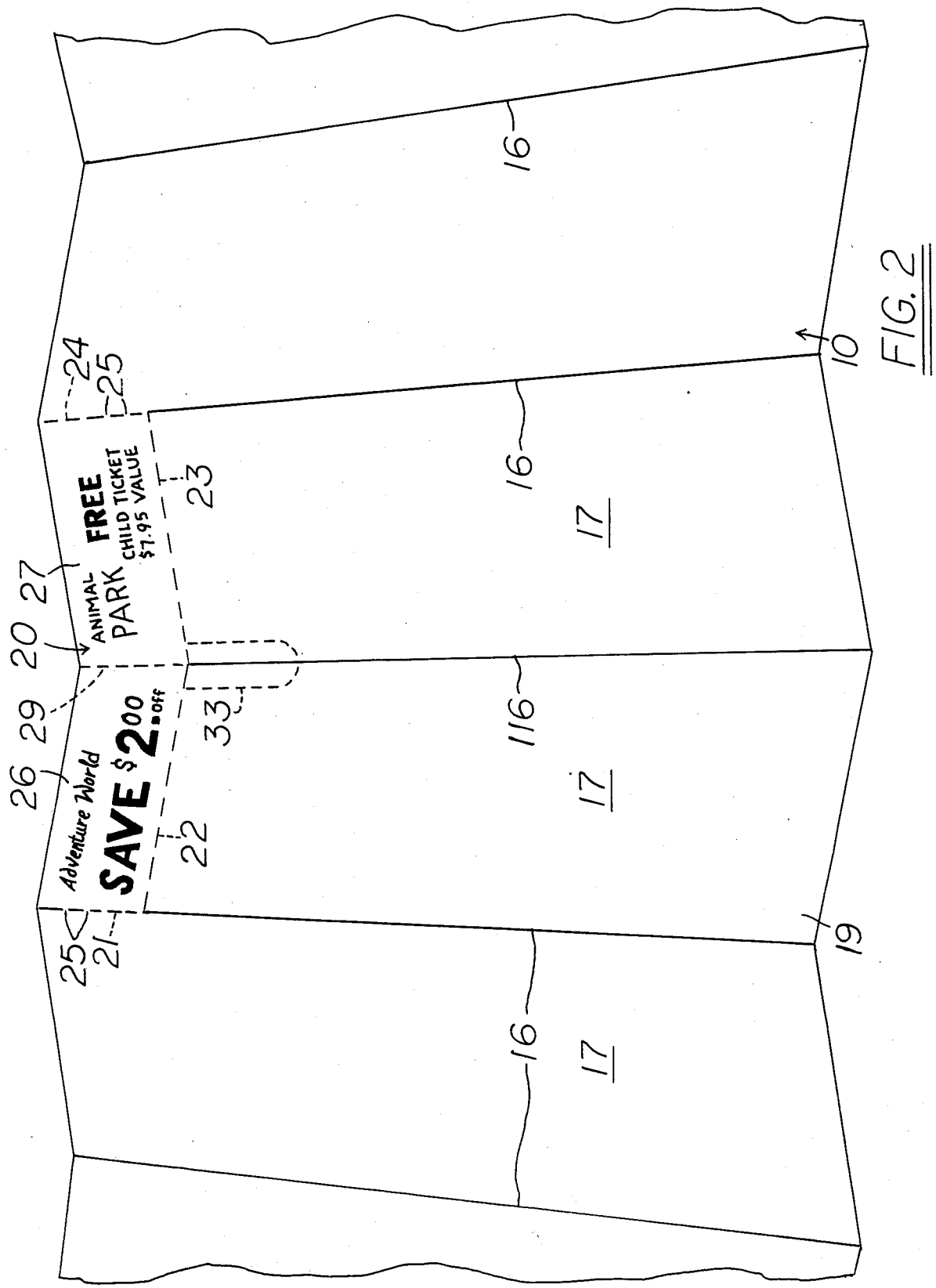

MOTOR VEHICLE SUNSHIELDS AND SUNSHIELD MAKING METHODS

BACKGROUND OF THE INVENTION

1. Field of the Invention

The subject invention relates to sunshields and, more particularly, to sunshields or shades for protecting the interior of motor vehicles against sun rays and blaze, particularly during outdoor parking and the like.

2. Information Disclosure Statement

The following disclosure statement is made pursuant to the duty of disclosure imposed by law and formulated in 37 CFR 1.56(a). No representation is hereby made that information thus disclosed in fact constitutes prior art, inasmuch as 37 CFR 1.56(a) relies on a materiality concept which depends on uncertain and inevitably subjective elements of substantial likelihood and reasonableness and inasmuch as a growing attitude appears to require citation of material which might lead to a discovery of pertinent material though not necessarily being of itself pertinent. Also, the following comments contain conclusions and observations which have only been drawn or become apparent after conception of the subject invention or which contrast the subject invention or its merits against the background of developments which may be subsequent in time or priority.

Also, no preamble of any statement of invention or claim hereof is intended to represent that the content of that preamble is prior art, particularly where one or more recitations in a preamble serve the purpose or providing antecedents for the remainder of a statement of invention or claim.

Also, no sequential recitation or listing in any claim, summary of the invention or other part hereof is intended as a limitation to the provision of such means or provision or performance of such steps or features in that or any other particular sequence, unless the claimed sequence is the or an essential feature of the claimed combination over the prior art.

As may be seen from page 181 of the May 1953 issue of POPULAR SCIENCE, attempts to "keep your car from heating like a greenhouse when you must park in direct sunlight," go back for many years. In particular, it was then suggested to cut white cardboard shades for all windows, making each shade ⅛" too wide or big, the idea being, "Spring them in place and they will stay put." Major problems of that proposal included the considerable skill and manual dexterity actually required for making and installing such cardboard shades as specified, and the fact that the combination of that teaching in effect resulted in a glass/cardboard laminate through which heat from the sun could transfer from the outside to the inside of the car without any substantial intervening air layer or circulation.

The same probably applied to the windshield heat reflector disclosed in U.S. Pat. No. 3,880,461 by George Paul Flanagan, issued Apr. 29, 1975.

None of these proposals ever found any significant public use, not even after ten millions of my motor vehicle sunshields have been sold by my CARCOOL Company and by several licensees, as mentioned, for instance, in the article "Folding Car Shades Are a Red-Hot Item in Sun Belt," published Monday, Sept. 8, 1986 in the Business section of the Los Angeles Times. As therein confirmed, I am holding the patent rights for that kind of sunshield, as apparent from my U.S. Pat. No. 4,202,396, issued May 13, 1980.

Even though more than twenty-five millions of my sunshields have now been sold, their operation and effect still cannot satisfactorily be explained by the state of the art of scientific technology. In an age where exponents of scientific knowledge carried the greenhouse effect into outer space to explain the working of the universe, my sunshield simply defies the greenhouse effect which, in so many words, insists that "Once the heat is in (e.g. through the windshield and in the air space between the windshield and my unfolded sunshield), it has lost energy and cannot go back out where it came from." Yet, the fact observable on any sunny day is that my sunshield not only prevents sun damage to dashboards and car interiors, but also keeps the inside of cars measurably cooler during hot days.

My sunshields practically from the start made provisions for a car's rearview mirror behind the windshield. This is also emphasized in U.S. Pat. No. 4,652,039, by Roger H. Richards, issued Mar. 24, 1987 to one of my licensees, and going to the extent of cutting the material of that windshield shade "out of the top, so that the shade will not contact a rearview mirror."

Even though the removable curtain assembly of U.S. Pat. No. 4,647,102, issued Mar. 3, 1987 to Mozaffar Ebrahimzadeh, uses a pleated structure drawable from one side of the windshield through the space in between windshield and rearview mirror to the other side of the windshield, that patent still points out that the pleated panel may have a cutout in the top section thereof in order to accommodate the rearview mirror.

SUMMARY OF THE INVENTION

It is a general object of this invention to provide improved sunshields for shading motor vehicles inside of windows thereof.

It is a germane object of this invention to provide improved methods of making sunshields and to provide improved sunshields made by such methods.

It is a related object of this invention to enhance the value of sunshields for shading motor vehicles.

It is also an object of this invention to enhance the attractiveness of such sunshields.

It is a further object of this invention to broaden the utility of such sunshields without impairment of their quality for any one use thereof.

It is a related object of this invention to prompt the retail purchaser or ultimate user to complete the making of the sunshield to make way for a rearview mirror or any other component of the motor vehicle when the sunshield is positioned inside the windshield or other window of a motor vehicle.

It is a related object of this invention to provide new functional relationships and utility through combination of printed matter with physical structure.

It is a further object of this invention to employ its methods to make articles of manufacture of superior value, utility or quality.

Other objects of this invention will become apparent in the further course of this disclosure.

From one aspect thereof, the invention resides in a method of making a sunshield for shading a motor vehicle inside a window thereof, that motor vehicle having a component inside and in the vicinity of that window. The invention according to this aspect resides in the improvement comprising, in combination, the steps of making the sunshield of a shading material having a predetermined value per unit area, dividing the sunshield into a main body and a predetermined portion adjacent that main body corresponding in location to the above mentioned component of the motor vehicle in terms of a positioning of the sunshield in the window, scoring the sunshield between its main body and said predetermined portion, and imparting to that predetermined portion a redeemable value being greater in terms of unit area than the value per unit area first mentioned in this paragraph.

The invention also resides in sunshields made by this method in which the above mentioned predetermined portion is manually torn away from the main body at the scoring to leave that main body with serrated edges along the sides where the predetermined portion was torn from the main body, to produce at least one redeemable coupon having a greater redemption value than the main body in terms of unit area, and at the same time to make way for said component of the motor vehicle when the sunshield main body is positioned inside said window.

In practice, the latter step may be performed by the retail producer or ultimate user of the sunshield, thereby producing higher value while at the same time adapting the sunshield to a specific use.

The expression "serrated" as herein employed is intended to be sufficiently broad to cover the kind of edge left by separation along a slit score or perforation or any other kind of scoring.

From another aspect thereof, the subject invention resides in a sunshield for shading a motor vehicle inside a window thereof, that motor vehicle having a component inside and in the vicinity of that window, comprising, in combination, a sunshield main body of a shading material having a predetermined value per unit area, a predetermined portion adjacent that main body corresponding in location to the above mentioned component of the motor vehicle in terms of a positioning of the sunshield in the window, and having a redeemable value being greater in terms of unit area than the value per unit area first mentioned in this paragraph, and means for tearably interconnecting the predetermined portion with the main body, including score lines along sides of that predetermined portion.

BRIEF DESCRIPTION OF THE DRAWINGS

The subject invention and its various objects and aspects will become more readily apparent from the following detailed description of preferred embodiments thereof, illustrated by way of example in the accompanying drawings, wherein like reference numerals designate like or equivalent parts, and in which:

FIG. 2 is a fraction, on an enlarged scale, of the sunshield of FIG. 1 as initially manufactured pursuant to a preferred embodiment of the subject invention.

DESCRIPTION OF PREFERRED EMBODIMENTS

Figure 1:
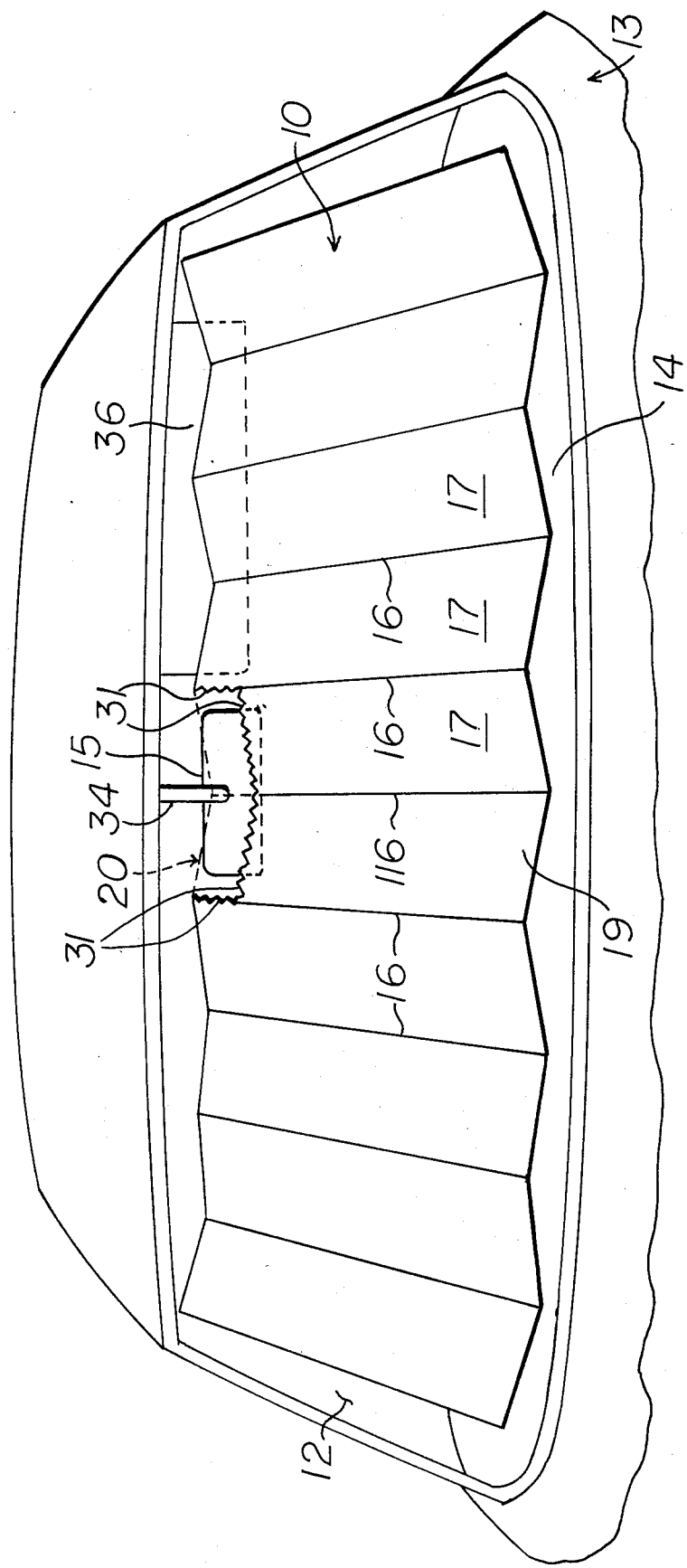
FIG. 1 is a perspective front view of part of a motor vehicle structure in combination with a sunshield prepared according to a preferred embodiment of the subject invention.

The sunshield 10 according to the preferred embodiment of the invention illustrated also in FIG. 2, is shown positioned behind the windshield 12 of a motor vehicle or passenger automobile 13 having a dashboard 14 and a rearview mirror 15 behind the windshield.

For the basic sunshield structure, and for various modifications thereof not specifically shown in the drawings, reference may be had to my above mentioned earlier U.S. Pat. No. 4,202,396 issued to me, Abraham Levy, on May 13, 1980, for Motor vehicle and Sunshields, and herewith incorporated by reference herein.

The sunshield 10 has folds 16 herein simply referred to as "vertical folds," even though these folds need not be strictly vertical but may, for instance, fan out somewhat relative to a center fold line 116. The sunshield may be symmetrical relative to that typically vertical center fold line. The fold lines 16 and 116 divide the sunshield into a plurality of panels 17, which may be rectangular or substantially rectangular, and which are alternately biased clockwise and counterclockwise by the sunshield material at, and relative to, the illustrated fold lines.

The sunshield may be sold, distributed and stored in a folded condition representing a substantially rectangular stack of the panels 17. Such stack may then be unfolded and positioned behind a window to be shaded, such as behind the windshield 12 as shown in FIG. 1.

The sunshield 10 is made of corrugated cardboard or of another inexpensive shading material. As shown in the drawings, the sunshield 10 is divided into a main body 19 and a predetermined portion 20 adjacent that main body. The predetermined portion 20 corresponds in location to the rearview mirror 15 of the motor vehicle 13 in terms of a positioning of the sunshield 10 in the window 12, such as shown in FIG. 1.

During its manufacture, the sunshield is scored between its main body 19 and the predetermined portion 20; score lines 21, 22, 23 and 24 being visible in FIG. 2 between the main body 19 on the one hand and the predetermined portion 20 on the other hand. These score lines 21 to 24, including the intermittent pieces of material 25 left therealong after the scoring process, constitute means for tearably interconnecting the predetermined portion 20 with the main body 19. The expression "scoring" and expressions of like import herein employed are intended to be sufficiently broad to cover slit scoring, perforation and the like.

Corrugated cardboard or other stock from which sunshields of the type illustrated in the drawings are made, is typically priced by the manufacturer or converter in terms of square foot, square yard, square meter or another unit area customary in the particular location. Accordingly, the shading material of the sunshield 10, or of the main body or proper 19 after removal of the predetermined portion 20, has a predetermined value per unit area.

On the other hand, the subject invention imparts to that predetermined portion 20 a redeemable value being greater in terms of unit area than the value per unit area mentioned with respect to the latter shading material. The subject invention is not particularly partial as to how that should be done. To give a trite example, printing or otherwise applying a heavy gold layer over the predetermined portion 20 would certainly increase its value per unit area way over the value of the remainder of the sunshield. However, except for a few areas of the world, there may be problems in redeeming the precious metal thus obtained upon separation of the portion 20 from the sunshield proper. Accordingly, even though technically within the scope of the subject invention, printing a precious metal onto the portion 20 currently appears as practically unfeasible as printing bank notes thereon.

However, my best mode for carrying out the subject invention combines printed matter and structure in the form of the predetermined portion 20 to provide from the sunshield 10 one or more redeemable coupons 26 and 27 separable from the main body 19 along the score lines 21 to 24. This combination of printed matter and structure in the form of the predetermined portion 20 then jointly manifest the greater redeemable value according to the illustrated preferred embodiment. In other words, the structure in the form of the predetermined portion 20 and the printed matter physically located thereon jointly manifest that greater redeemable value, relative to the sunshield proper or main body.

As already mentioned above, the content of the printing does not matter to the nature and to the operation of the subject invention. Of course, one would avoid printings which are excessively expensive, illegal in the particular jurisdiction, or tortious under the particular circumstances. However, apart from that, the workings of the illustrated 19 preferred embodiment of the invention are impartial to what is printed onto the predetermined portion 20 or coupons 26 and 27. By way of example, FIG. 2 illustrates a combination of printing and structure which converts the left-hand region into a discount coupon 26 after separation from the remainder of the sunshield along score lines 21, 22 and 29.

On the other hand, FIG. 2 shows the right-hand region of portion 27 convertible into a free admission ticket upon separation along score lines 23 and 24. In this respect, the entire portion 20 may first be removed along score lines 21, 22, 23 and 24, and the coupon 26 may then be separated from the ticket 27 along the score line 29.

By way of example, FIG. 2 shows a total of $9.95 as redeemable value of the separable portion 20. These and other practical totals may in fact be greater than whatever redeemable value the sunshield main body 19 has after separation of the removable portion 20.

According to a preferred embodiment of the invention, the value of the removable portion 20 is made redeemable by an ultimate user for as much as a suggested retail price of the sunshield 10, such as the manufacturer's suggested retail price for the entire sunshield 10 with coupons and tickets 26 and 27 integrated therewith along score lines 21 to 24. Alternatively, the predetermined portion 20 may be greater in monetary value to an ultimate user than the sunshield main body 19 after removal of the predetermined portion 20. Of course, this is not to say that the sunshield proper or main portion 19 would not be of high functional value to the ultimate user. To the contrary, an ultimate user of the sunshield 10 is prompted by the greater value of the predetermined portion 20 to complete the making of the sunshield by removing that selected predetermined portion from the main body 19 at the scoring 21 to 24 for its greater value, thereby making way for the rearview mirror 15 when the sunshield main body is positioned inside the windshield 12, typically on the dashboard 14.

In particular, the sunshield 10 is made ready for its intented use shown in FIG. 1 by manually tearing the predetermined portion 20 away from the main body 19 at the scoring 21, 22, 23, etc., to leave the main body with serrated edges 31 along the sides where the portion 20 has been, and to produce at least one redeemable coupon 26 or ticket 27 having a greater redemption value than the main body 19 in terms of unit area, and to make way for the rearview mirror 19 when the sunshield main body is positioned inside the window 12. In this respect and in general, the sunshield proper or main body 19 may somewhat overlap in location with the rearview mirror 15, so as to be releasably retained thereby.

Further U-shaped or other scoring 33 may be provided to enable a user to produce manually a cutout for the stem 34 of a rearview mirror, in case that stem does not depend from the ceiling of the vehicle, as in FIG. 1, but rather projects from the inside of the windshield, as in some modern automobiles.

The car's sunvisors one of which is seen in FIG. 1 at 36, may additionally or alternatively be employed to hold the sunshield proper in place.

At least part of the scoring, such as the scoring 21, 24 and 29, may be provided along part of selected ones of the fold lines, such as the center fold line 116 and the fold lines 16 immediately adjacent thereto. In practice, this preferred embodiment of the invention greatly facilitates the separation of the portion 20 from the sunshield main body 19. Within the scope of that illustrated embodiment, the removable portion 20 may be subdivided into more than just two areas 26 and 27. By way of example, four coupons and/or tickets may be provided by subdividing the areas 26 by a further score line in parallel to the score lines 21 and 29, and by subdividing the area 27 by a further score line in parallel to the score lines 24 and 29. Other variations are also within the scope of the subject invention.

For example, if the sunshield has hanger flaps as shown at 54 in my above mentioned patent, a greater redeemable value may be imparted to such flaps, such as in the manner shown for areas 26 and 27, and such flaps may be rendered removable as redeemable coupons or tickets by potentially separating them from their corresponding panels 17 by appropriate scoring. However, the presently most favored embodiments of the subject invention prefers the impartation of the greater value to the portion 20 or to another portion of the sunshield corresponding in location to a component of the motor vehicle inside the vicinity of a window of that vehicle.

In other words, while FIG. 1 and its description emphasize utility of the preferred embodiments in terms of inside rearview mirrors, the scope of the subject invention is not so limited, but may extend to an accommodation of other motor vehicle components at the inside of any window which is to be shaded by a sunshield.

By way of example, the brake lights now present at rear windows in most modern cars may present an impediment to shading the rear window. In that case, removing all or part of the predetermined portion 20 and turning the sunshield around, so that the resulting cutout is at the bottom in order to accommodate the brake light housing at the rear window, would solve the problem. In this respect, where four or more coupons or tickets are provided in the portion 20 as mentioned above, only two or less than all of these may need to be removed from the sunshield in order to accommodate the rear brake light housing, which typically is of less width than the rearview mirror behind the windshield. Alternatively, another redeemable portion, similar to portion 20, could be provided at the bottom of the sunshield within the scope of the subject invention.

Articles of manufacture made by methods of the subject invention are superior in value, quantity and quality to sunshields made by other known methods. For instance, the drawings and embodiments within their contemplation represent a greater redeemable value than prior-art sunshields before or after removal of cutouts. Also, having one, two or more discount coupons, tickets and the like, in addition to a highly useful sunshield, is obviously more than just having a sunshield for any comparable price. In terms of quality, imparting significant redeemable values to portions corresponding to vehicle components (15, etc.) behind a vehicle window (12, etc.) encourages the ultimate user to prepare the windshield by removal of such portions for use in conjunction with the particular vehicle component.

Conversely, if the purchaser wishes to put the sunshield 10 to a use other than as shown in FIG. 1, he or she can leave its overall configuration intact, by foregoing a removal of the portion 20 or of either of the coupons or tickets 26 or 27.

In addition to, or instead of printing, an increased value may be imparted to the illustrated portion 20, or to another portion of the sunshield, by applying a fragrant substance thereto. For instance, the coupon 26 may be provided with a substance that will exude fragrance in the car's interior. If such a fragrant tab is detachable from the sunshield proper, it can be placed or suspended in the car at the best location therefor.

Not all score lines need to be straight. For instance, the portion 20 may be scored in the form of a puzzle which can be taken apart and reassembled by children.

The subject extensive disclosure will render apparent or suggest to those skilled in the art various modifications and variations within the spirit and scope of the invention or equivalents thereof.

I claim:

1. In a method of making a sunshield for shading a motor vehicle inside a window thereof, said motor vehicle having a component inside and in the vicinity of said window, the improvement comprising, in combination, the steps of:
   making said sunshield of a shading material having a predetermined value per unit area;
   dividing said sunshield into a main body and a predetermined portion adjacent said main body corresponding in location to said component of the motor vehicle in terms of a positioning of the sunshield in said window;
   scoring said sunshield between said main body and said predetermined portion; and
   imparting to said predetermined portion a redeemable value being greater in terms of unit area than the value per unit area first mentioned herein.

2. A method as claimed in claim 1, wherein:
   an ultimate user of said sunshield is prompted by the greater value of said predetermined portion to complete the making of the sunshield by removing said predetermined portion from said main body at said scoring for said greater value, thereby making way for said component of the motor vehicle when the sunshield main body is positioned inside said window.

3. A method as claimed in claim 1, wherein:
   said imparting of a greater redeemable value comprises imparting to said predetermined portion a value being redeemable by an ultimate user for as much as a suggested retail price of said sunshield.

4. A method as claimed in claim 1, wherein:
   said imparting of a greater redeemable value comprises printing up said predetermined portion in the form of at least one redeemable coupon having a greater redemption value than said main body.

5. A method as claimed in claim 1, wherein:
   said window is a windshield and said component of the motor vehicle is a rearview mirror behind said windshield; and
   said predetermined portion is selected to correspond in location to said rearview mirror.

6. A method as claimed in claim 5, wherein:
   an ultimate user of said sunshield is prompted by the greater value of said predetermined portion to complete the making of the sunshield by removing said selected predetermined portion from said main body at said scoring for said greater value, thereby making way for said rearview mirror when the sunshield main body is positioned inside said windshield.

7. A method as claimed in claim 1, including the step of:
   combining printed matter and structure in the form of said predetermined portion to provide from said sunshield a redeemable coupon separable from said main body.

8. A method as claimed in claim 1, including the steps of:
   providing said sunshield with fold lines; and
   providing part of said scoring along part of selected ones of said fold lines.

9. A sunshield for shading a motor vehicle inside a window thereof, said motor vehicle having a component inside and in the vicinity of said window, comprising in combination:
   a sunshield main body of a shading material having a predetermined value per unit area;
   a predetermined portion adjacent said main body corresponding in location to said component of the motor vehicle in terms of a positioning of the sunshield in said window, and having a redeemable value being greater in terms of unit area than the value per unit area first mentioned herein; and
   means for tearably interconnecting said predetermined portion with said main body, including score lines along sides of said predetermined portion.

10. A sunshield as claimed in claim 9, wherein:
    said predetermined portion is greater in monetary value to an ultimate user than said sunshield main body.

11. A sunshield as claimed in claim 9, wherein:
    said predetermined portion has a value redeemable by an ultimate user for as much as a suggested retail price of said sunshield.

12. A sunshield as claimed in claim 9, including:
    a combination of printed matter and structure in the form said predetermined portion jointly manifesting said greater redeemable value.

13. A sunshield as claimed in claim 9, wherein:
    said window is a windshield and said component of the motor vehicle is a rearview mirror behind said windshield;
    said predetermined portion corresponds in location to said rearview mirror.

14. A sunshield as claimed in claim 9, wherein:
    said sunshield has fold lines; and
    selected ones of said score lines extend along part of predetermined ones of said fold lines.

15. In sunshield for shading a motor vehicle inside a window thereof, said motor vehicle having a component inside and in the vicinity of said window, a combination made by a method including, in combination, the steps of:

making said sunshield of a shading material having a predetermined value per unit area;

dividing said sunshield into a main body and a predetermined portion adjacent said main body corresponding in location to said component of the motor vehicle in terms of a position of the sunshield in said window;

scoring said sunshield along sides of said predetermined portion;

imparting to said predetermined portion a redeemable value being greater in terms of unit area than the value per unit area first mentioned herein; and manually tearing said predetermined portion away from said main body at said scoring to leave said main body with serrated edges along said sides and to produce at least one redeemable coupon having a greater redemption value than said main body in terms of unit area, and to make way for said component of the motor vehicle when the sunshield main body is positioned inside said window.

16. The combination of claim 15, wherein:

said predetermined portion is converted into said redeemable coupon by an ultimate user of said sunshield manually tearing said predetermined portion having said greater redeemable value away from said main body along said scoring, thereby making way for said component of the motor vehicle when the sunshield main body is positioned inside said window.

17. A sunshield as claimed in claim 15, wherein:

said predetermined portion is greater in monetary value to an ultimate user than said sunshield main body.

18. A sunshield as claimed in claim 15, wherein:

said predetermined portion has a value redeemable by an ultimate user for as much as a suggested retail price of said sunshield.

19. A sunshield as claimed in claim 15, including:

a combination of printed matter and structure in the form said predetermined portion jointly manifesting said greater redeemable value.

20. A sunshield as claimed in claim 15, wherein:

said window is a windshield and said component of the motor vehicle is a rearview mirror behind said windshield; and said predetermined portion corresponds in location to said rearview mirror.

21. The combination of claim 15, including the steps of:

providing said sunshield with fold lines; and providing part of said scoring along part of selected ones of said fold lines.

* * * * *